(12) United States Patent
Sakai et al.

(10) Patent No.: US 6,517,885 B2
(45) Date of Patent: Feb. 11, 2003

(54) PROCESS FOR PREPARATION OF MUSTARD POWDER AND MUSTARD CAKE

(75) Inventors: Makoto Sakai, Saitama (JP); Hisao Tanaka, Saitama (JP); Shiro Sakai, c/o 1-29-11 Nakajima, Urawa, Saitama 338-0822 (JP)

(73) Assignee: Shiro Sakai, Saitama (JP)

( * ) Notice: Subject to any disclaimer, the term of this patent is extended or adjusted under 35 U.S.C. 154(b) by 173 days.

(21) Appl. No.: 09/782,623

(22) Filed: Feb. 13, 2001

(65) Prior Publication Data

US 2001/0018091 A1 Aug. 30, 2001

Related U.S. Application Data

(63) Continuation-in-part of application No. 09/415,421, filed on Oct. 8, 1999, now abandoned.

(30) Foreign Application Priority Data

Oct. 9, 1998 (CA) .............................................. 2250620

(51) Int. Cl.$^7$ .............................. A23L 1/01; A23L 1/22
(52) U.S. Cl. ........................ 426/638; 426/479; 426/481; 426/482; 426/484; 426/518; 426/629; 426/638

(58) Field of Search ................................ 426/479, 481, 426/482, 484, 518, 629, 638

(56) References Cited

U.S. PATENT DOCUMENTS

| 2,987,399 A | * | 6/1961 | Goering ........................... 99/2 |
| 3,574,640 A | * | 4/1971 | Dougherty .................... 99/140 |
| 4,496,598 A | * | 1/1985 | Sakai et al. .................. 426/638 |

FOREIGN PATENT DOCUMENTS

| RU | 2112019 C1 | * | 3/1997 |
| RU | 1997-0103431 | | 5/1998 |

\* cited by examiner

*Primary Examiner*—Helen Pratt
(74) *Attorney, Agent, or Firm*—Charles G. Lamb; Middleton Reutlinger

(57) ABSTRACT

A process is provided for the production of a pressed mustard cake from mustard seed, as well as mustard powder yielded from the milling of the mustard cake of the process. Employing strict temperature controls at key points in the process, this process yields a mustard cake and mustard powder of increased pungency, good flavor, enhanced protein content and enhanced preservability by limiting the degradation of key components in the mustard seed by excessive temperatures in the process.

18 Claims, No Drawings

1

PROCESS FOR PREPARATION OF MUSTARD POWDER AND MUSTARD CAKE

This application is a continuation in part of application Ser. No. 09/415,421 filed Oct. 8, 1999, now abandoned, which claims priority to Canadian Patent Application No. 2,250,620.

BACKGROUND OF THE INVENTION

Mustard has been used for many years by humans for its flavoring and medicating effects. The dry mustard used in this fashion include mustard flour which is produced by milling dehulled mustard seed; mustard powder, which is produced by milling dehulled mustard seed; ground mustard, which is produced by simply grinding mustard seed without removing the hull or any other fraction in advance of the grinding process; and deheated mustard, which is used for its major component, namely protein content.

The handling of the mustard seed before and during processing can effect the outcome or the desired product. For example, in the case of U.S. Pat. No. 4,496,598, to Sakai for the preparation of mustard flour, the mustard seed is subjected to high heat in advance of grinding to deactivate the enzyme myrosinase therein, which will yield a milder flour product. In the case of mustard powder on the other hand where it is desired to maximize the flavor yielded by the enzyme myrosinase, it is obvious that the process of this earlier Sakai reference is not applicable and would not be desirable since the preservation of myrosinase will be preferred.

Preserving the maximum flavor in and extending the shelf life of a processed spice product are the main problems in this technical field. The heat generated during processing, and the presence of oil and moisture which dissolve and control the activity of the enzyme myrosinase are the major factors in maintaining the quality of the final product. In producing a mustard product, it is the goal to remove as much of the hulls and the oil as possible from the mustard seed used in advance of the milling process, and to take whatever other steps are necessary to maximize the pungency, taste, medicating effects and the percentage of other desired components in the final product.

SUMMARY OF THE PRESENT INVENTION

It is the object of the present invention to provide a process for the production of improved quality mustard cake and mustard powder, by improvement of the processes and equipment currently employed in the art. The process of the present invention, a process for producing mustard cake from raw mustard seed, comprises the steps of drying the mustard seed to a starting moisture content; removing at least a portion of the hulls from the mustard seed; and producing mustard cake by expelling crude oil from the dehulled mustard seed by pressing at a temperature in the range of 45 to 55 degrees Celsius.

The dehulling of the mustard seed starts with cracking and removing some of the hulls from the mustard seed being processed.

Various pressing methods might be used in the expulsion step, including several conventional mechanical presses.

By keeping the temperature of the dehulled mustard seed below 55 degrees Celsius, and more particularly below 50 degrees Celsius, during expelling, destruction of the enzyme myrosinase can be avoided. This process will yield a high quality mustard cake with activated enzyme myrosinase sustained, enhanced pungency, flavor and improved medicating effects.

The mustard cake produced by the process of the present invention might be milled into mustard powder. Various methods might be used to process the mustard cake into mustard powder. Milling could be done at a temperature below 30 degrees Celsius in order to maximize product quality. The mustard cake might be broken up into smaller pieces in advance of the milling.

Various mustard cakes produced from different types of mustard seed, or produced in independent batches under different process parameters, might be blended to produce a qualitatively varied product. The milled mustard powder might be further cleaned to provide a finer powder product, either by sifting or other methods of removing remaining loose hulls or other impurities.

By making minor adjustments to the processing temperature or time, or oil content remaining in the mustard cake, the characteristics of the end product, mustard powder, can be altered. By blending together powder from more than one batch produced from a different variety of mustard seed or produced under different parameters, various optimized end products can be produced.

DETAILED DESCRIPTION OF PREFERRED EMBODIMENTS

The current invention relates to a process for the production of mustard cake and mustard powder from mustard seed.

Mustard seed has hulls thereon and the seed carries oil. Various varieties of mustard seed will have different oil contents, as well as different flavoring characteristics or other characteristics which may or may not be desirable in a particular end product. As will be discussed in further detail below, the end mustard cake or mustard powder product of the process of the present invention could be altered by mixing together the mustard cake or mustard powder product produced from various batches of different mustard seed varieties, or alternatively by mixing various mustard seed varieties together in the quantity of mustard seed ran through the process. It will be understood that such variations in starting seed material, or variations produced by blending finished product from various mustard seed varieties, are contemplated within the scope of the present invention and that even though the remainder of the specification refers to "mustard seed" in such a fashion as might refer to a singular seed variety being used in the process, it should also be read to possibly include such blended seed stock.

The mustard seed should be cleaned in advance of commencing the process of the present invention. The cleaning of the mustard seed to be processed markedly improves the quality of the final product.

The first stage of the process of the present invention is to dry the mustard seed to be processed to a predetermined starting moisture condition. A better end product is achieved by drying the mustard seed to condition it in advance of further processing. In particular it is contemplated that the starting mustard seed material should be dried to a moisture content in the range of 6 to 7 percent. Various methods of drying the seed material could be used, including both air drying as well as other mechanically aided drying methods. It will also be understood that in certain circumstances if the moisture content of the mustard seed to be processed were too low, that mustard seed could be conditioned to a higher starting moisture content and that type of conditioning will be contemplated within the scope of the present invention as well.

The reason why the mustard seed is dried to the requisite moisture content is to further emphasize the difference in the composition of the components between the hulls and the nucleii, which will assist in the dehulling/removal of cracked hulls from the remainder of the material in question.

The next step in the process is to dehull the dried mustard seed and remove at least a portion of the hulls. The dehulling process might be done by cracking the seeds using something such as a conventional flaking mill, and the cracked seed hulls might then be able to be removed using an aspirator or some other conventional method. It will be understood that various methods of removal of the hulls of the mustard seed and separation of at least some portion thereof from the nuclei of the mustard seed might be conceived, and each of these various methods is contemplated within the scope of the present invention. It is particularly contemplated that the hull represents at least 8 weight percent of the total volume of seed material which should be removed by the difference in the composition of the cracked seed components. It will be understood, however, that the removal of an additional percentage of the cracked hulls from the remainder of the seed material in advance of expelling will yield a cleaner final product.

Following the dehulling of the mustard seed and removal of loosened seed hulls, the remaining fraction is dehulled mustard seed to be further processed to eventually produce mustard cake and mustard powder. Not all of the cracked seed hulls would be removed in advance of the remainder of the process, since the fiber contained in these remaining hulls is utilized during the process of expulsion of oil therefrom, and those portions of cracked seed hulls remaining following the expulsion can be removed.

The oil globules existing in the seed nucleii are destroyed by the cracking. The next step in the process of the present invention is to expel oil from the dehulled mustard seed by pressing, which expulsion produces mustard cake. Low temperature expulsion of the oil from the cracked mustard seed is key to the success of the present process. Expulsion of oil from the seed at a pressing temperature in the range of 45 to 55 degrees Celsius ensures that strong activated enzyme myrosinase can be sustained. Expulsion of oil from the cracked mustard seed can be carried out in any number of fashions. Various presses might be used and it will be understood that any such mechanical or chemical method of expelling oil from the cracked mustard seed while controlling the temperature during expulsion and holding said temperature in the range of 45 to 55 degrees is contemplated within the scope of the present invention.

The amount of oil which might be removed could vary according to several factors including the specific type of mustard seed used, condition of the seed material, and desired qualities of the finished product. It is anticipated that in most cases the optimal oil content of expelled mustard seed/mustard cake would be in the range of twenty to eight weight percent. It will be understood, however, that in certain circumstances the oil content of the pressed seed might be outside of this range and is still contemplated within the scope of the present invention insofar as the process of the present invention might be used.

The expulsion process yields mustard cake, which can be used in its own form or could be further processed into mustard powder. The next optional step in the process of the present invention would be to mill the mustard cake produced by the process of the present invention into mustard powder. Any number of conventional milling, sifting or other grinding methods might be used to produce mustard powder from the mustard cake.

It will be understood that all types of milling machinery employed is contemplated within the scope of the present invention insofar as might be obvious to one skilled in the art. Milling should be conducted at a relatively low temperature in order to preserve the product. It is particularly contemplated that keeping the milling temperature in the range of 20 to 30 degrees Celsius, and not above 30 degrees Celsius, would yield the best final product.

The mustard cake might also be broken into smaller pieces in advance of commencing the milling into mustard powder. The crushed mustard cake might then be further tempered to a particular moisture content in advance of milling.

During the milling process, remaining loose seed hulls and other impurities can be removed from the mustard powder produced, by sifting or other conventional methods of cleaning impurities from powder.

Various parameters of the milling process could be adjusted to provide the highest quality product also. For example, the mustard cake could be dried to a certain moisture level before being further processed—this moisture level might be adjusted.

Thus it can be seen that the invention accomplishes all of its stated objectives. The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

We claim:

1. A process for producing mustard cake from mustard seed, said mustard seeds each having a hull thereon and oil fixed therein, said process comprising the steps of:
    a) drying mustard seed to be processed to a starting moisture content;
    b) dehulling the dried mustard seed by cracking the dried mustard seed to yield, cracked mustard seed and loosened cracked seed hulls;
    c) removing a portion of the loosened cracked seed hulls therefrom; that which remains being dehulled mustard seeds;
    d) forming mustard cake by pressing the dehulled mustard seed to expel a portion of the oil therefrom; and
    e) maintaining the temperature of the dehulled mustard seed during said pressing, being the pressing temperature, below 55 degrees Celsius to minimize the degradation of the myrosinase enzyme present in said dehulled mustard seed by the pressing temperature.

2. The process of claim 1 wherein the loosened cracked seed hulls removed from the cracked mustard seed comprise more than eight percent of the total weight of the starting mustard seed.

3. The process of claim 1 wherein the pressing temperature is in the range of 45 to 55 degrees Celsius.

4. The process of claim 1 wherein the oil content of the mustard cake is in the range of twenty to eight weight percent.

5. The process of claim 1 wherein the starting moisture content is in the range of approximately six to seven percent.

6. The process of claim 1 further comprising milling the mustard cake into mustard powder.

7. Mustard powder produced by the process of claim 6.

8. Mustard cake produced by the process of claim 1.

9. A process for producing mustard powder from mustard seed, said mustard seeds each having a hull thereon and oil fixed therein, said process comprising the steps of:

a) drying the mustard seed to be processed to a starting moisture content;

b) dehulling the mustard seed by cracking the dried mustard seed to yield cracked mustard seed and loosened cracked seed hulls;

c) removing a portion of the loosened cracked seed hulls therefrom; that which remains being dehulled mustard seeds;

d) forming mustard cake by pressing the dehulled mustard seed to expel a portion of the oil therefrom;

e) maintaining the temperature of the dehulled mustard seed during said pressing, being the pressing temperature, below 55 degrees Celsius to minimize degradation of the myrosinase enzyme present in said dehulled mustard seed by the pressing temperature; and f) milling said mustard cake into mustard powder.

10. The process of claim 9 wherein the milling is carried out at a temperature below 30 degrees Celsius.

11. The process of claim 10 wherein the milling is carried out at a temperature in the range of 20 to 30 degrees Celsius.

12. The process of claim 9 wherein the starting moisture content is in the range of approximately six to seven percent.

13. The process of claim 9 further comprising breaking the mustard cake into pieces in advance of milling.

14. The process of claim 13 further comprising drying the mustard cake before breaking.

15. The process of claim 9 further comprising drying the mustard cake before milling.

16. The process of claim 9 further comprising cleaning the mustard powder after milling to remove remaining loosened cracked seed hulls and other impurities.

17. The process of claim 16 wherein the cleaning includes sifting.

18. Mustard powder produced by the process of claim 9.

* * * * *